Sept. 23, 1952     H. P. CURLEE     2,611,467

TRANSFER DEVICE

Filed Dec. 23, 1949

INVENTOR.
Harvey P. Curlee
BY
Bailey, Stephens & Huettig
ATTORNEYS

Patented Sept. 23, 1952

2,611,467

UNITED STATES PATENT OFFICE 2,611,467

TRANSFER DEVICE

Harvey P. Curlee, Raleigh, N. C., assignor to Curlee Machinery Company, Inc., a corporation of North Carolina Application December 23, 1949, Serial No. 134,750

2 Claims. (Cl. 193—43)

This invention relates to a device for transferring articles. In particular, the invention is directed to a mechanism for transferring articles from a fabricating machine to a wrapping machine.

The invention is described as applied to the making and packaging of bakery products such as cookies, coated or uncoated crackers, and cracker sandwiches. Here before, when such articles came off of the fabricating machine, it was necessary to assemble them manually, and then to place them in the feeding mechanism of a wrapping machine. This manual handling was expensive, unsanitary, and wasteful in the breakage of articles due to handling.

An object of the instant invention is to produce a device which will mechanically transfer articles from a fabricating to a wrapping machine. Other objects are to produce a mechanism for rearranging thin flat articles from a flat lying position to a standing on edge position, and to convey predetermined numbers of said on edge articles in groups to the feeding mechanism of a wrapping machine.

In general, these objects are accomplished by discharging a line of articles from the fabricating machine into a guiding device which, by the means of inclined guide plates, advances all but one of the articles out of line in varying distances, and at the same time turns the articles from a flat to a standing on edge position. A conveyor located beneath the device collects the standing articles by moving transversely of the direction they are delivered to the guiding device. Each row of articles thus collected is composed of articles received by the guiding device from a plurality of successive lines of articles on the fabricating machine. These rows of articles are fed directly into the wrapping machine.

The means by which the objects of the invention are achieved are more fully described with reference to the accompanying drawings, in which.

Figure 2:
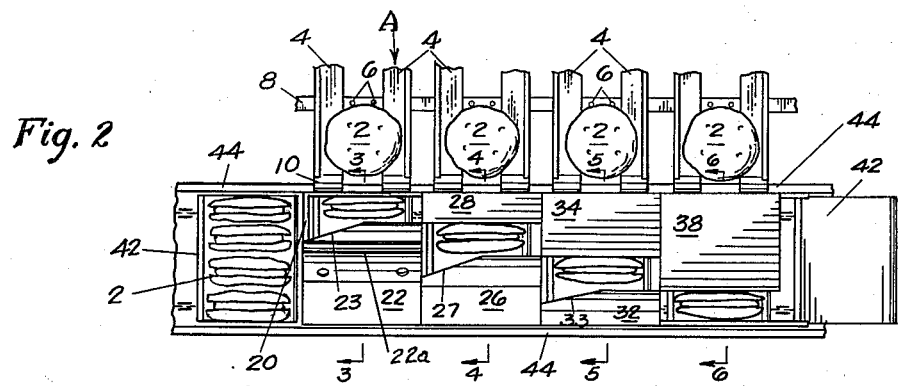
Figure 2 is a plan view of the mechanism.

Figures 3 to 6, inclusive, are cross-sectional views on the lines 3—3, 4—4, 5—5, and 6—6, respectively, of Figure 2.

Figure 1:
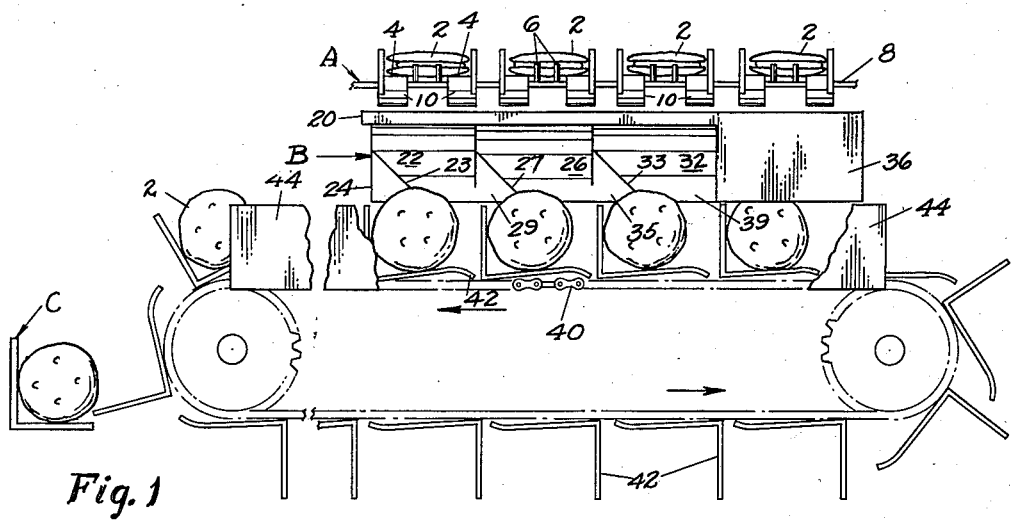
Figure 1 is a front elevational view of the transfer mechanism.

In Figures 1 and 2, the delivery end A of a cracker sandwich machine is illustrated for the purpose of describing the invention. Successive lines of cracker sandwiches 2 are pushed along trackways composed of rails 4 by pins 6 mounted on a traveling crossbar 8. The ends 10 of rails 4 are curved downwardly. Heretofore the crackers were discharged over curved ends 10 onto a table or conveyor belt without order, and from which they were picked up by hand and arranged in rows to be fed into a wrapping machine.

The instant invention provides a guiding device B for receiving the crackers from machine A and arranging and conveying them into a wrapping machine, diagrammatically indicated at C.

Device B is composed of a rectangular frame 20 extending transversely of and below the discharge ends 10 of rails 4. Mounted within said frame are guide plates paired with baffle plates, a pair for each of the trackways on machine A, and the plates in each pair being spaced to form a cracker positioning slot. As shown more clearly in Figures 3 to 6, inclusive, the upper ends of the plates are secured to frame 20, while the lower edges of the guide plates are connected to a cut-out base plate which is connected to the side walls of frame 20.

Figures 3, 4, 5, 6:
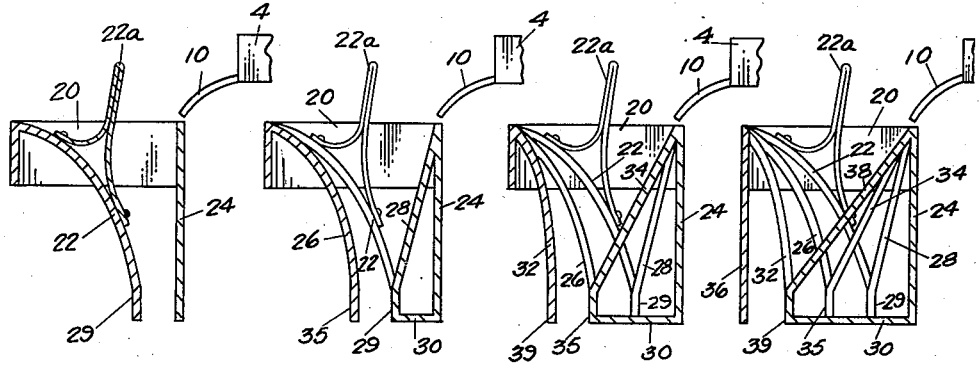

In Figure 3 the baffle plate 22 is composed of a curved plate secured at its upper end to frame 20, the lower end being held by means hereafter described. A corner is cut off of this baffle to form a bevel edge 23. The guide plate 24 is a vertical member which forms one side wall of frame 20. The lower ends of plates 22 and 24 are spaced to form a slot therebetween. In order to guide properly certain sized articles, it is sometimes preferred to modify the guiding surface of baffle 22 by adding thereto a second baffle 22a.

The plates forming a second slot are shown in Figure 4. Curved baffle plate 26 is secured at its upper end to frame 20, a corner being cut off this plate to form bevel edge 27. Guide plate 28, secured at its upper end to frame 20, forms the second member of this pair, the lower ends of plates 26 and 28 being spaced to form a slot.

Plates 22 and 28 are formed from the same sheet of material, the sheet being slit, the plate 22 being bent in one direction and plate 28 being bent in the opposite direction, the two plates being integral with a straight flat portion 29. This portion is secured to base plate 30 which is also secured to side wall 24. Portion 29 thus is included in plate 22 as the lower edge thereof, and serves as the fastening means for said lower edge.

In Figure 5, the third slot is formed between curved baffle plate 32 and inclined guide plate 34, the top edges of these plates being joined to frame 20, and their lower edges being spaced to form a slot. A corner is cut off from plate 32 to form bevel edge 33. Plates 26 and 34 are bent from the same sheet of material and have a common bottom portion 35 which is secured to base plate 30.

Figure 6 shows the fourth slot formed between a vertical baffle plate 36, which may be integral with and form a side wall of frame 20, and an inclined plate 38 having its upper end secured to frame 20. Plates 32 and 38 are bent from the same sheet of material and have a common lower edge portion 39 which is secured to base plate 30.

Mounted beneath frame 20 is an endless conveyor 40 to which are secured L-shaped carriers 42, these carriers traveling between side walls 44. The vertical height of carriers 42 is slightly less than the height of a cracker standing on edge.

The operation of this mechanism is as follows. Lines of crackers are discharged from machine A over the ends 10 of rails 4, and drop into device B. Except for the cracker falling into the first slot, the remaining crackers are advanced out of line by varying distances as determined by the inclination of the respective guide plates, the crackers being spot positioned on carriers 42, and being stood on edge. The conveyor 42 is timed with respect to machine A so that after one line of crackers has been dropped into device B, the carriers 42 are moved one space to the left in Figure 1. Therefore, after the machine has been operating to pass the first three partially filled carriers, each carrier will leave the machine with a row of four crackers, or cracker sandwiches, standing on edge, and such will be delivered directly to wrapping machine C.

As each cracker drops into a carrier, its upper edge is guided by the lower edge of the baffle plate forming one side of the slot through which the cracker has been dropped, to hold the cracker vertical and in position so that space is left on the carrier 42 for receiving a second cracker. Thus the cracker dropped in the fourth described slot is guided by the edge 39 to a point below the third slot, at which point a second cracker has been received, and the first cracker begins to clear bevel edge 33. This second cracker will be guided by edge 35 until bevel edge 27 is reached, and the third received cracker will be guided by edge 29 until bevel edge 23 is reached. These edge portions 29, 35, and 39 are flat and vertical, the baffle plates being curved there above in order to provide clearance for the upper edges of the crackers.

Four crackers are simultaneously dropped into device B. Consequently, after the first three intermittent movements of conveyor 40, the carrier 42 under the fourth slot will always hold one cracker, the carrier under the third slot will have two crackers, the carrier under the second slot having three crackers, and the carrier under the first slot having four crackers. The beveled edges 23, 27, and 33, respectively, clear the crackers of the top edge guiding walls as quickly as possible, and thus eliminate friction between the crackers and guiding surfaces which would tend to hold back the crackers and displace them on the carriers while conveyor 40 is moving. At the same time, the beveled edges make the respective slots accessible from the exterior of frame 20, and thus the slots between the baffles can be quickly cleared if jammed by a broken cracker.

This article transferring mechanism simply and efficiently takes articles from a fabricating machine, and groups them in proper number and position for feeding a wrapping machine. Even fragile articles such as crackers are handled gently, little breakage occurring by dropping the crackers into the slots. The elimination of manual labor both increases the sanitary conditions in the bakery as well as increases shop production.

Having now described the means by which the objects of the invention are achieved,

I claim:

1. A device for turning simultaneously a plurality of flat-shaped articles from a flat lying position into groups of rows in edge standing position comprising a rectangular frame having an upper edge, a plurality of guide plates secured to said upper edge and projecting downwardly at progressively increasing angles, a plurality of complementary baffle plates secured to the opposite upper edge of said frame, and being spaced from their respective companion guide plates to form at their lower edges passageways for holding flat objects on edge.

2. A device as in claim 1, all of guide plates, and all of said baffle plates; respectively, having an integral lower edge.

HARVEY P. CURLEE.

REFERENCES CITED

The following references are of record in the file of this patent:

FOREIGN PATENTS

| Number | Country | Date |
|---|---|---|
| 660,199 | France | July 8, 1929 |
| 519,628 | Germany | Mar. 2, 1931 |